(12) United States Patent
Marchand et al.

(10) Patent No.: US 9,376,636 B2
(45) Date of Patent: Jun. 28, 2016

(54) PROCESS FOR HYDRODESULPHURATION OF GASOLINE CUTS USING A CATALYST BASED ON HETEROPOLYANIONS TRAPPED IN A MESOSTRUCTURED SILICA SUPPORT

(75) Inventors: Karin Marchand, Munich (DE); Elodie Devers, Lyons (FR); Alexandra Chaumonnot, Lyons (FR); Audrey Bonduelle, Francheville (FR); Veronique Dufaud, Villeurbanne (FR); Frederic Lefebvre, Beaufort (FR); Manuela Bader, Rennes (FR); Susana Lopes Silva, Lyons (FR)

(73) Assignees: CNRS, Paris (FR); IFP ENERGIES NOUVELLES, Rueil-Malmaison (FR)

(*) Notice: Subject to any disclaimer, the term of this patent is extended or adjusted under 35 U.S.C. 154(b) by 239 days.

(21) Appl. No.: 13/995,800

(22) PCT Filed: Dec. 15, 2011

(86) PCT No.: PCT/FR2011/000656
§ 371 (c)(1),
(2), (4) Date: Feb. 11, 2014

(87) PCT Pub. No.: WO2012/085357
PCT Pub. Date: Jun. 28, 2012

(65) Prior Publication Data
US 2014/0183100 A1  Jul. 3, 2014

(30) Foreign Application Priority Data

Dec. 22, 2010 (FR) .................................. 10 05032

(51) Int. Cl.
| | |
|---|---|
| *C10G 45/04* | (2006.01) |
| *B01J 27/186* | (2006.01) |
| *B01J 27/188* | (2006.01) |
| *B01J 27/19* | (2006.01) |
| *C10G 45/10* | (2006.01) |
| *B01J 29/03* | (2006.01) |
| *B01J 35/00* | (2006.01) |
| *B01J 35/10* | (2006.01) |
| *B01J 37/03* | (2006.01) |
| *B01J 37/10* | (2006.01) |
| *B01J 37/20* | (2006.01) |
| *C10G 45/06* | (2006.01) |
| *B01J 27/195* | (2006.01) |
| *B01J 27/198* | (2006.01) |

(52) U.S. Cl.
CPC .............. *C10G 45/10* (2013.01); *B01J 27/186* (2013.01); *B01J 27/188* (2013.01); *B01J 27/19* (2013.01); *B01J 29/0333* (2013.01); *B01J 29/0341* (2013.01); *B01J 35/002* (2013.01); *B01J 35/1019* (2013.01); *B01J 35/1042* (2013.01); *B01J 35/1057* (2013.01); *B01J 35/1061* (2013.01); *B01J 37/033* (2013.01); *B01J 37/10* (2013.01); *B01J 37/20* (2013.01); *C10G 45/04* (2013.01); *C10G 45/06* (2013.01); *B01J 2229/20* (2013.01); *C10G 2300/104* (2013.01); *C10G 2300/1044* (2013.01); *C10G 2300/202* (2013.01); *C10G 2300/4018* (2013.01); *C10G 2400/02* (2013.01)

(58) Field of Classification Search
CPC ........ B01J 27/186; B01J 27/188; B01J 27/19; B01J 27/195; B01J 27/198
See application file for complete search history.

(56) References Cited

U.S. PATENT DOCUMENTS

| | | | |
|---|---|---|---|
| 6,903,048 B2 | 6/2005 | Iwata et al. | |
| 7,737,071 B2 | 6/2010 | Kiriyama et al. | |
| 2004/0186013 A1 | 9/2004 | Iwata et al. | |
| 2008/0017551 A1 | 1/2008 | Kiriyama et al. | |
| 2008/0020926 A1* | 1/2008 | Guillaume et al. | 502/314 |
| 2008/0314797 A1* | 12/2008 | Sinclair et al. | 208/49 |

FOREIGN PATENT DOCUMENTS

| | | | | |
|---|---|---|---|---|
| EP | 1 733 787 | | 12/2006 | |
| WO | WO 2004/005435 A1 * | 1/2004 | | C10G 27/00 |

OTHER PUBLICATIONS

Wang, A. et al. (2001). Journal of Catalysis, 199, 19-29.*
International Search Report for PCT/FR2011/000656, Date of the actual completion of international search report: Feb. 14, 2012, Date of mailing of international search report: Feb. 28, 2012.
Lamonier, C. et al., "Molybdocobaltate cobalt salts: New starting materials for hydrotreating catalysis," Applied Catalysis B: Environmental, 2007, 70, pp. 548-556.
Martin, Catherine, "Catalyseurs d'hydrodesulfuration prepares a partir d'heteropolyanions de type Anderson," Universite des Sciences et Technologies de Lille, Oct. 21, 2003.

(Continued)

*Primary Examiner* — Brian McCaig
(74) *Attorney, Agent, or Firm* — Millen White Zelano and Branigan, PC; John Sopp; Anthony Zelano

(57) ABSTRACT

A process of hydrodesulphuration of at least one gasoline cut implementing a catalyst comprising, in its oxide form, at least one metal from group VIB and/or at least one metal from group VIII of the periodic table, present in the form of at least one polyoxometalate of the formula $(H_hX_xM_mO_y)^{q-}$, wherein X is an element selected from phosphorus, silicon, boron, nickel and cobalt, M is one or more element(s) selected from molybdenum, tungsten, nickel and cobalt, h is an integer from 0-12, x is an integer from 0-4, m is an integer 5, 6, 7, 8, 9, 10, 11, 12 and/or 18, y is an integer of 17-72 and q is an integer of 1-20, the polyoxometalates being present within a mesostructured silicon oxide matrix having a pore size of 1.5-50 nm and having amorphous walls of thickness 1-30 nm, the catalyst being sulphured before use in the process.

9 Claims, No Drawings

(56) References Cited

OTHER PUBLICATIONS

Rives, A. et al., "Silica and alumina impregnated with dimethylformamide solutions of molybdophosphoric or tungstophosphoric acids for hydrotreatment reactions," Catalysis Letters, 2001, vol. 71, No. 3-4, pp. 193-201.

Yan, X-M et al., "Synthesis and characterization of mesoporous phosphotungstic acid/$TiO_2$ nanocomposite as a novel oxidative desulfurization catalyst," Journal of Molecular Catalysis A: Chemical, 2009, vol. 304, pp. 52-57.

Yan, X-M. et al., "Oxidative Desulfurization of Diesel Oil using Mesoporous Phosphotungstic Acid/$SiO_2$ as Catalyst," Journal of the Chinese Chemical Society, 2007, vol. 54, pp. 911-916.

Yan, X-M. et al., "Synthesis and catalytic properties of mesoporous phosphotungstic acid/$SiO_2$ in a self-generated acidic environment by evaporation-induced self-assembly," Materials Research Bulletin, 2007, vol. 42, pp. 1905-1913.

* cited by examiner

PROCESS FOR HYDRODESULPHURATION OF GASOLINE CUTS USING A CATALYST BASED ON HETEROPOLYANIONS TRAPPED IN A MESOSTRUCTURED SILICA SUPPORT

The present invention relates to the field of hydrotreatment (HDT) of hydrocarbon feeds, the said hydrocarbon feeds preferably being feeds of the catalytic cracking gasoline type.

Its main subject is the use of a catalyst in processes enabling the hydrodesulphuration (HDS) of hydrocarbon feeds, the said hydrocarbon preferably being feeds of the catalytic cracking gasoline type.

PRIOR ART

Hydrocarbon feeds of the gasoline type, and more particularly gasolines derived by catalytic cracking (FCC) contain about 20 to 40% olefinic compounds, 30 to 60% aromatic compounds and 20 to 50% saturated compounds of the paraffinic or naphthenic type. Of the olefinic compounds, the branched olefins are in the majority as compared with the linear and cyclic olefins. These gasolines similarly contain traces of highly unsaturated compounds of the diolefinic type which are capable of deactivating catalysts by formation of gums. The sulphur compound content of these gasolines is highly variable depending on the gasoline type (steam-cracking, catalytic-cracking, coking, etc.) or, in the case of catalytic cracking, on the severity applied to the process. The said content can fluctuate between 200 and 5000 ppm of sulphur, preferably between 500 and 2000 ppm of sulphur relative to the mass of the feed. The families of the thiophenic and benzothiophenic compounds are in the majority, the mercaptans only being present at very low levels generally within the range 10 to 100 ppm. The FCC gasolines also contain nitrogenous compounds in proportions generally not exceeding 100 ppm.

The production of reformulated gasolines corresponding to environmental standards requires in particular that their concentration of olefins is reduced as little as possible in order to preserve a high octane index, but that the sulphur content is greatly reduced. Thus, current and future environmental standards are constraining refiners to reduce the sulphur content of gasolines to values below 10 ppm as from 2009. These standards relate not only to the total content of sulphur in gasolines, but also to the nature of the sulphur compounds such as the mercaptans. The catalytic cracking gasolines, which may represent 30 to 50% of the gasoline pool, have elevated olefin and sulphur contents. The sulphur present in reformulated gasolines is imputable, in a proportion of almost 90%, to FCC gasoline. The desulphuration (hydrodesulphuration) of gasolines, and principally of FCC gasolines is therefore of obvious importance for compliance with the specifications. Hydrotreatment and, in particular, hydrodesulphuration of catalytic cracking gasolines, when performed under the classical conditions known to the person skilled in the art, enables the sulphur content of the cut to be reduced. However, this method has the major disadvantage of inducing a very great decline in the octane index of the cut, due to saturation of the olefins by hydrogenation of the said olefins in the course of hydrotreatment. Processes have therefore been proposed which enable the FCC gasolines to be substantially desulphured while maintaining the octane index at a high level, that is, while maintaining a good selectivity for the reaction of olefin hydrodesulphuration versus the hydrogenation reaction thereof (the ratio of hydrodesulphuration to hydrogenation of olefins must therefore be as high as possible). For example, U.S. Pat. No. 5,318,690 proposes a process consisting of fractionating the gasoline, softening the light fraction and hydrotreating the heavy fraction on a conventional catalyst then treating it on a zeolite ZSM-5 to recover approximately the initial octane index.

Obtaining a good selectivity for the olefin hydrodesulphuration reaction versus the hydrogenation reaction (ratio between the hydrodesulphuration and hydrogenation of olefins) can therefore be in part obtained by the choice of method, but in all cases the use of an intrinsically selective catalytic system is very often a key factor.

Different ways of improving the selectivity of catalysts in favour of the gasoline hydrodesulphuration reaction exist. One way of improving the intrinsic selectivity of catalysts is to exploit the presence of carbon-containing deposits at the surface of the catalyst. Thus, U.S. Pat. No. 4,149,965 proposes pretreating a conventional catalyst by naphtha hydrotreatment to partially deactivate it prior to its use for gasoline hydrotreatment. Similarly, patent application EP0745660A1 indicates that the pretreatment of a catalyst so as to deposit between 3 and 10 wt. % of coke improves catalytic performance. In this case, it is stipulated that the ratio C/H must not exceed 0.7. In order to improve the selectivity, it is also possible to optimise the density of oxide of the group VIB element per square meter of support. Thus, U.S. Pat. No. 7,223,333 recommends surface density values within the range $4.10^{-4}$ to $36.10^{-4}$ g of oxide of VIB element per $m^2$ of support.

However, new techniques for catalyst preparation need to be developed to further improve the performance of these catalysts and satisfy future legislation.

It is generally acknowledged that a hydrotreatment catalyst of high catalytic potential is characterised by an optimised hydro-dehydrogenating function, that is, by an active phase perfectly dispersed at the surface of the support and having a high metal content. Ideally, whatever the nature of the hydrocarbon feed to be treated, the catalyst must be able to demonstrate an accessibility of the active sites to reactants and products of reaction while at the same time developing a larger active surface area, resulting in specific constraints in respect of structure and texture that are specific to the oxide support constituting the said catalysts.

The composition and use of conventional catalysts for the hydrotreatment of hydrocarbon feeds are described well in "Hydrocracking Science and Technology", 1996, J. Scherzer, A. J. Gruia, Marcel Dekker Inc and in the article of B. S. Clausen, H. T. Topsøe, F. E. Massoth, from the work "Catalysis Science and Technology", 1996, volume 11, Springer-Verlag. Thus, these catalysts are generally characterised by the presence of an active phase based on at least one metal from group VIB and/or at least one metal from group VIII of the periodic table of the elements. The most widely-used formulations are of the cobalt-molybdenum (CoMo), nickel-molybdenum (NiMo) and nickel-tungsten (NiW) types. These catalysts can be in bulk, or in the supported state, in which case they include a porous solid of a different nature. In the latter case, the porous support is generally an amorphous or poorly crystallised oxide such as, for example, an alumina, or an aluminosilicate, optionally combined with a zeolithic or non-zeolithic material. Following preparation, at least one group VIB metal and/or at least one group VIII metal constituting the said catalysts are often in the oxide form. As the form of the said catalysts for the hydrotreatment processes that is active and stable is the sulphured form, these catalysts must undergo a sulphuration step. This may be performed within the unit for the associated process, when it is called sulphuration in-situ, or before the catalyst is fed into the unit, in which case it is called sulphuration ex-situ.

The conventional methods leading to the formation of the active phase of hydrotreatment catalysts consist in a deposition of molecular precursor(s) of at least one group VIB metal and/or at least one group VIII metal onto an oxide support by the technique known as "dry impregnation" followed by the steps of maturation, drying and calcination leading to the formation of the oxidised form of the said metal(s) used. This is followed by the final step of sulphuration which generates the active phase, as mentioned above.

The catalytic performances of hydrotreatment catalysts derived from these "conventional" synthesis protocols have been widely studied. In particular, it has been shown that, when metal contents are relatively elevated, phases refractory to sulphuration appear, which are formed consecutively to the calcination step and are due to a sintering phenomenon (B. S. Clausen, H. T. Topsøe, and F. E. Massoth, from "Catalysis Science and Technology", 1996, volume 11, Springer-Verlag). For example, in the case of catalysts of the CoMo or NiMo type supported on a support of the aluminic nature, these phases refractory to sulphuration are either crystallites of metallic oxides of the formula $MoO_3$, $NiO$, $CoO$, $CoMoO_4$ or $Co_3O_4$, of sufficient size to be detected by DRX, or species of the type $Al_2(MoO_4)_3$, $CoAl_2O_4$ or $NiAl_2O_4$, or both. The three species of type $Al_2(MoO_4)_3$, $CoAl_2O_4$ or $NiAl_2O_4$ containing the element aluminium are well-known to the person skilled in the art. They result from the interaction between the alumina support and the precursor salts in solution of the active phase, the chemical manifestation of which is a reaction between $Al^{3+}$ ions extracted from the alumina matrix and the said salts to form Anderson heteropolyanions of the formula $[Al(OH)_6Mo_6O_{18}]^{3-}$, themselves precursors of phases refractory to sulphuration. The presence of all these species together leads to a not inconsiderable indirect loss of the catalytic activity of the associated hydrotreatment catalyst, because the elements belonging to at least one group VIB metal and/or at least one group VIII metal are not entirely utilised to their maximum potential, since a portion thereof is immobilised in minimally active or inactive species.

The catalytic performances of the conventional hydrotreatment catalysts described above could therefore be improved, notably by developing new methods of preparing these catalysts, which would enable:
1) assurance of a good dispersion of the active phase, particularly for elevated metal contents, for example by controlling the size of the particles based on transition metals and maintaining the properties of these particles following heat treatment,
2) limitation of the formation of species refractory to sulphuration, for example by achieving a better synergy between the transition metals constituting the active phase and control of the interactions between the active phase and/or its precursors, and the porous support employed,
3) assurance of a good diffusion of the reactants and of the reaction products while also maintaining large developed active surface areas, for example by optimising the chemical, textural and structural properties of the porous support.

A number of research pathways regarding the development of new hydrotreatment catalysts have attempted to respond to the needs stated above.

The research conducted by the Applicant thus led to the preparation of hydrotreatment catalysts by modifying the chemical and structural composition of the metallic species that are precursors of the active phases and thus by modifying the interactions between the support and the active phase of the catalyst and/or its oxide precursors. In particular, the work of the Applicant led to the use of the polyoxometalates of the formula given below as specific oxide precursors of the active phase of the catalysts implemented in the hydrodesulphuration process of gasolines according to the invention.

Moreover, as the oxide support of the catalyst plays a not inconsiderable role in the development of high-performance hydrotreatment catalysts to the extent that it induces modifications of the interactions between the support and the active phase of the said catalyst and/or its oxide precursors, the research work of the Applicant was also directed towards the preparation of hydrotreatment catalysts using oxide supports having particular textural properties.

The Applicant has therefore demonstrated that a catalyst comprising, in its oxide form, at least one active phase precursor in the form of at least one polyoxometalate of the formula $(H_hX_xM_mO_y)^{q-}$ explained below, trapped actually within a mesostructured silica oxide matrix serving as a support, showed an improved catalytic activity by comparison with catalysts prepared from standard precursors not containing polyoxometalates trapped in the said matrix, the said catalyst being sulphured then implemented in a hydrodesulphuration process of at least one gasoline, preferably catalytic cracking gasoline.

One aim of the present invention is to provide a hydrodesulphuration process of a gasoline cut, and preferably a gasoline cut derived by catalytic cracking, implementing a catalyst having improved catalytic performances in hydrodesulphuration.

Another aim of the present invention is to provide a hydrodesulphuration process of a gasoline cut, and preferably a gasoline cut derived by catalytic cracking, implementing a catalyst having improved catalytic performances, the said process enabling losses in gasoline cut to be minimised and the octane index to be maintained at a high level by controlling the saturation of olefins by hydrogenation in the course of hydrodesulphuration.

SUMMARY OF THE INVENTION

The invention relates to a hydrodesulphuration process of at least one gasoil cut implementing a catalyst comprising, in its oxide form, at least one metal of group VIB and/or at least one metal of group VIII of the periodic table present in the form of at least one polyoxometalate of the formula $(H_hX_x M_mO_y)^{q-}$, wherein X is an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), O is oxygen, H is hydrogen, h is an integer within the range 0 to 12, x is an integer within the range 0 to 4, m is an integer equal to 5, 6, 7, 8, 9, 10, 11, 12 and 18, y is an integer within the range 17 to 72 and q is an integer within the range 1 to 20, the said polyoxometalates being present within a mesostructured silicon oxide matrix having a pore size within the range 1.5 to 50 nm and having amorphous walls of thickness within the range 1 to 30 nm, the said catalyst being sulphured before being implemented in the said process.

BENEFITS OF THE INVENTION

One of the advantages of the present invention is given by the implementation, in a hydrodesulphuration process of at least one hydrocarbon feed, of a catalyst having simultaneously the catalytic properties specific to the presence of polyoxometalates and the properties of surface reactivity of the mesostructured silicon oxide matrix in which the said polyoxometalates are trapped. The result of this is innovative properties and interactions between the said polyoxometalates and the mesostructured inorganic silica lattice of the said matrix. These interactions are manifested in a significant improvement in the hydrodesulphuration activity as compared with the catalysts described in the prior art, this being due in particular to a better dispersion of the active phase owing to the use of a silicon oxide matrix in which polyoxometalates are trapped. These interactions are also manifested in a significant improvement in the selectivity of the said catalysts for the olefin hydrodesulphuration reaction versus the hydrogenation reaction as compared with the catalysts described in the prior art,

DESCRIPTION OF THE INVENTION

The invention relates to a process of hydrodesulphuration of gasoline cuts, and in particular gasoline cut derived by catalytic cracking.

Feeds

According to the invention, the hydrocarbon feed implemented in the hydrodesulphuration process according to the invention is a sulphur-containing gasoline cut. A gasoline cut treated in the hydrodesulphuration process according to the invention is preferably a gasoline cut having a final boiling point equal to or below 250° C. Such a gasoline cut may advantageously be derived from a coking unit, a viscosity reduction (visbreaking) unit, a steam-cracking unit, or Fluid Catalytic Cracking (FCC) unit. The gasoline cut treated in the hydrodesulphuration process according to the invention is preferably derived from a catalytic-cracking unit.

Gasoline cuts derived from a catalytic-cracking unit advantageously exhibit a range of boiling points which advantageously extend from the boiling points of hydrocarbons having 5 carbon atoms to a final boiling point equal to or below 250° C. The said gasoline cut derived from a catalytic-cracking unit may optionally be composed of a significant fraction of at least one gasoline cut sourced from other production processes such as, for example, a gasoline cut derived by atmospheric distillation, a gasoline cut derived by direct distillation (or "straight-run gasoil"), or of a gasoline cut derived by conversion processes (coking or steam-cracking gasoline).

The gasoline cuts implemented in the hydrodesulphuration process according to the invention and more particularly the gasoline cuts derived by catalytic cracking (FCC) advantageously contain about 20 to 40% olefinic compounds, 30 to 60% aromatic compounds and 20 to 50% saturated compounds of the paraffinic or naphthenic type. Of the olefinic compounds, the branched olefins are in the majority as compared with the linear and cyclic olefins. These gasolines similarly contain traces of highly unsaturated compounds of the diolefinic type which are capable of deactivating catalysts by formation of gums. The sulphur compound content of the said gasolines is highly variable depending on the source of the gasoline type (steam-cracking, catalytic-cracking, coking, etc.) or, in the case of catalytic cracking, on the severity applied to the process. The content of sulphur compounds can fluctuate between 200 and 5000 ppm of sulphur, preferably between 500 and 2000 ppm of sulphur relative to the mass of the feed. The families of the thiophenic and benzothiophenic compounds are in the majority, the mercaptans only being present at very low levels generally within the range 10 to 100 ppm. The gasolines derived by catalytic cracking also contain nitrogenous compounds in proportions generally not exceeding 100 ppm.

The hydrodesulphuration process of at least one gasoline cut according to the invention is advantageously implemented at a temperature within the range 250° C. to 400° C., preferably 250° C. to 350° C. at a total pressure within the range 1 MPa to 3 MPa and preferably 1 MPa to 2.5 MPa with a ratio of the volume of hydrogen to volume of hydrocarbon feed within the range 100 to 600 liters per liter and preferably within the range 200 to 400 liters per liter, and at an hourly space velocity (HSV) defined by the ratio of the volumetric flow rate of liquid hydrocarbon feed to the volume of catalyst fed into the reactor within the range 1 to 10 h$^{-1}$, and preferably 2 to 8 h$^{-1}$.

According to the invention, the catalyst used in the said hydrodesulphuration process comprises, in its oxide form, that is to say before having undergone a sulphuration step generating the sulphide active phase, at least one metal of group VIB and/or at least one metal of group VIII of the periodic table present in the form of at least one polyoxometalate of the formula $(H_hX_xM_mO_y)^{q-}$ explained above, the said polyoxometalates being present within a mesostructured silicon oxide matrix.

More precisely, the said polyoxometalates present within the said matrix are trapped in the walls of the said matrix. The said polyoxometalates are therefore not simply deposited, for example by impregnation at the surface of the pores of the said matrix, but are located actually within the wall of the said matrix.

The characteristic localisation of the said polyoxometalates actually within the wall of the said mesostructured silicon oxide matrix enables a better interaction between the said matrix serving as a support and the active phase and/or its oxide precursors comprising the said polyoxometalates. This also results in improved retention of the textural and structural properties of the mesostructured silicon oxide matrices, improved maintenance of the structure of the said polyoxometalate and preferably of the said heteropolyanion following post-treatment of the final solid, as well as improved dispersion, heat resistance and chemical resistance of the said polyoxometalate.

In a terminological idiosyncrasy, and throughout the remainder of the text, polyoxometalates used according to the invention are herein defined as being the compounds corresponding to the formula $(H_hX_xM_mO_y)^{q-}$, wherein X is an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), O is oxygen, H is hydrogen, h is an integer within the range 0 to 12, x is an integer within the range 0 to 4, m is an integer equal to 5, 6, 7, 8, 9, 10, 11, 12 and 18, y is an integer within the range 17 to 72 and q is an integer within the range 1 to 20.

The polyoxometalates defined according to the invention include two families of compounds, the isopolyanions and the heteropolyanions. These two compound families are defined in the article Heteropoly and Isopoly Oxometallates, Pope, Ed Springer-Verlag, 1983.

The isopolyanions which may be used in the present invention are polyoxometalates of the general formula $(H_hX_xM_mO_y)^{q-}$, wherein x=0, the other elements having the meaning given above.

Preferably, the m atoms of M of the said isopolyanions are either uniquely atoms of molybdenum, or uniquely atoms of tungsten, or a mixture of molybdenum and cobalt atoms, or a mixture of molybdenum and nickel atoms, or a mixture of tungsten and cobalt atoms, or a mixture of tungsten and nickel atoms. Among the m atoms of M of the said isopolyanions, the group VIII elements are partially substituted for the group VIB elements.

In particular, in the case wherein the m atoms of M are either a mixture of molybdenum atoms and cobalt atoms, or a mixture of molybdenum and nickel, or a mixture of tungsten and cobalt atoms, or a mixture of tungsten and nickel atoms, the cobalt and nickel atoms are partially substituted for the atoms of molybdenum and tungsten.

The m atoms of M of the said isopolyanions may similarly advantageously be either a mixture of nickel, molybdenum and tungsten atoms, or a mixture of cobalt, molybdenum and tungsten atoms.

In the case wherein the element M is molybdenum (Mo), m is preferably equal to 7. Similarly, in the case wherein the element M is tungsten (W), m is preferably equal to 12.

The isopolyanions (sic) $Mo_7O_{24}^{6-}$ and $H_2W_{12}O_{40}^{6-}$ are advantageously used as active phase precursors within the framework of the invention.

The said isopolyanions are advantageously formed by reaction of the oxoanions of type $MO_4^{2-}$ with one another. For example, the molybdenum compounds are well known for this type of reaction since, according to the pH, the molybdenum compound in solution may be in the form $MoO_4^{2-}$ or in the form of an isopolyanion of the formula $Mo_7O_{24}^-$ which is obtained according to the reaction: $7\ MoO_4^{2-}+8\ H^+ \rightarrow Mo_7O_{24}^{6-}+4\ H_2O$. In the case of the isopolyanions in which M is a tungsten atom, the potential acidification of the reaction medium may, by provoking the formation of $WO_4^{2-}$ tungstates, lead to the generation of α-metatungstate, 12-fold condensed according to the following reaction: $12\ WO_4^{2-}+18\ H^+ \rightarrow H_2W_{12}O_{40}^{6-}+8\ H_2O$.

The heteropolyanions which may be used in the present invention are polyoxometalates of the formula $(H_hX_xM_mO_y)^{q-}$, wherein x=1, 2, 3 or 4, the other elements having the meaning given above.

The heteropolyanions generally have a structure in which the element X is the "central" atom and the element M is a metal atom practically systematically in octahedral coordination, with X≠M.

Preferably, the m atoms of M are either uniquely atoms of molybdenum, or uniquely atoms of tungsten, or a mixture of molybdenum and cobalt atoms, or a mixture of molybdenum and nickel, or a mixture of tungsten and molybdenum atoms, or a mixture of tungsten and cobalt atoms, or a mixture of tungsten and nickel atoms. The m atoms of M are preferably either uniquely atoms of molybdenum, or a mixture of atoms of molybdenum and cobalt, or a mixture of molybdenum and nickel. Preferably, the m atoms of M cannot be uniquely atoms of nickel, nor uniquely atoms of cobalt.

Among the m atoms of M of the said heteropolyanions, the group VIII elements are partially substituted for the group VIB elements.

In particular, in the case wherein the m atoms of M are either a mixture of molybdenum and cobalt atoms, or a mixture of molybdenum and nickel, or a mixture of tungsten and cobalt atoms, or a mixture of tungsten and nickel atoms, the cobalt and nickel atoms are partially substituted for the atoms of molybdenum and tungsten and preferably for the atoms of molybdenum.

The element X is preferably at least one atom of phosphorus.

The heteropolyanions are advantageously obtained by polycondensation of oxoanions of the type $MO_4^{2-}$ around one or more oxoanion(s) of the type $XO_4^{q-}$, wherein the charge q is dictated by the octet rule and the position of the element X in the periodic table. There is then elimination of molecules of water and creation of oxo bridges between the atoms. These condensation reactions are governed by different experimental factors such as the pH, the concentration of the species in solution, the nature of the solvent, and the ratio m/x, being the ratio of the number of atoms of element M to the number of atoms of element X.

The heteropolyanions are negatively charged polyoxometalate species. To compensate for these negative charges, it is necessary to introduce counterions, and more particularly cations. These cations may advantageously be $H^+$ protons, or any other cation of type $NH_4^+$ or metal cations and, in particular, metal cations of the group VIII metals.

In the case where the counterions are protons, the molecular structure comprising the heteropolyanion and at least one proton constitutes a heteropolyacid. The heteropolyacids which may be used as active phase precursors in the present invention may be, by way of example, phosphomolybdic acid ($3H^+$, $PMo_{12}O_{40}^{3-}$), or the acid phosphotungstite ($3H^+$, $PW_{12}O_{40}^{3-}$).

In the case wherein the counterions are not protons, the term heteropolyanion salt is then used to designate this molecular structure. The association within the same molecular structure may then be advantageously exploited, via the use of a heteropolyanion salt, of the metal M and its promoter, that is to say the element cobalt and/or the element nickel which may either be in position X within the structure of the heteropolyanion, or in partial substitution for at least one atom M of molybdenum and/or of tungsten within the structure of the heteropolyanion, or in counterion position.

Preferably, the polyoxometalates used according to the invention are the compounds corresponding to the formula $(H_hX_xM_mO_y)^{q-}$, wherein X is an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), O being oxygen, h being an integer within the range 0 to 6, x is an integer equal to 0, 1 or 2, m being an integer equal to 5, 6, 7, 9, 10, 11 or 12, y being an integer within the range 17 to 48 and q is an integer within the range 3 to 12.

More preferably, the polyoxometalates used according to the invention are the compounds corresponding to the formula $(H_hX_xM_mO_y)^{q-}$, wherein h is an integer equal to 1, 4 or 6, x is an integer equal to 0, 1 or 2, m is an integer equal to 5, 6, 10 or 12, y is an integer equal to 23, 24, 38, 39 or 40, and q is an integer equal to 3, 4, 6 and [sic] 7, X, M, H and O having the meaning given above.

The preferred polyoxometalates used according to the invention are advantageously selected from the polyoxometalates of the formula $PMo_{12}O_{40}^{3-}$, $HPCoMo_{11}O_{40}^{6-}$, $P_2Mo_5O_{23}^{6-}$, $Co_2Mo_{10}O_{38}H_4^{6-}$, $CoMo_6O_{24}H_6^{3-}$ taken alone or in admixture.

Preferred polyoxometalates which may be advantageously used as active phase precursors of the catalyst implemented in the process according to the invention are the heteropolyanions called Anderson heteropolyanions of general formula $XM_6O_{24}^{q-}$ for which the ratio m/x is equal to 6 and wherein the elements X and M and the charge q have the meaning given above. The elements [sic] X is thus an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), and q is an integer within the range 1 to 20 and preferably within the range 3 to 12.

The specific structure of the said Anderson heteropolyanions is described in the article in Nature, 1937, 150, 850. The structure of the said Anderson heteropolyanions comprises 7 octahedrons positioned within the same plane and interconnected at the edges: out of the 7 octahedrons, 6 octahedrons surround the central octahedron containing the element X.

The Anderson heteropolyanions containing within their structure cobalt and molybdenum, or nickel and molybdenum are preferred. The Anderson heteropolyanions of the formula $CoMo_6O_{24}H_6^{3-}$ and $NiMo_6O_{24}H_6^{4-}$ are especially preferred. In conformity with the formula, in these Anderson heteropolyanions, the atoms of cobalt and nickel are respectively the heteroelements X of the structure.

Indeed, the said heteropolyanions combine, in the same structure, molybdenum and cobalt or molybdenum and nickel. In particular, when they are in the form of cobalt salts or nickel salt, these enable an atomic ratio of the said promoter to the metal M, and in particular an atomic ratio (Co and/or Ni)/Mo, within the range 0.4 to 0.6 to be achieved. This ratio of the said promoter (Co and/or Ni)/Mo within the range 0.4 to 0.6 is especially preferred for maximising the performance of these catalysts of hydrotreatment and in particular of hydrodesulphuration implemented in the process according to the invention.

In the case wherein the Anderson heteropolyanion contains cobalt and molybdenum within its structure, a mixture of the two monomeric forms of the formula $CoMo_6O_{24}H_6^{3-}$ and dimeric forms of the formula $Co_2Mo_{10}O_{38}H_4^{6-}$ of the said heteropolyanion, the two forms being in equilibrium, may be advantageously used. In the case wherein the Anderson heteropolyanion contains cobalt and molybdenum within its structure, the said Anderson heteropolyanion is preferably dimeric of the formula $Co_2Mo_{10}O_{38}H_4^{6-}$.

In the case wherein the Anderson heteropolyanion contains nickel and molybdenum within its structure, a mixture of the two monomeric forms of the formula $NiMo_6O_{24}H_6^{4-}$ and dimeric forms of the formula $Ni_2Mo_{10}O_{38}H_4^{8-}$ of the said heteropolyanion, the two forms being in equilibrium, may be advantageously used.

In the case wherein the Anderson heteropolyanion contains nickel and molybdenum within its structure, the said Anderson heteropolyanion is preferably monomeric of the formula $NiMo_6O_{24}H_6^{4-}$.

Salts of Anderson heteropolyanions may similarly be advantageously used as active phase precursors according to the invention. The said Anderson heteropolyanion salts are advantageously selected from the cobalt or nickel salts of the 6-molybdocobaltate monomeric ion, respectively of the formula $CoMo_6O_{24}H_6^{3-}$, $3/2Co^{2+}$ or $CoMo_6O_{24}H_6^{3-}$, $3/2Ni^{2+}$ having an atomic ratio of the said promoter (Co and/or Ni)/Mo of 0.41, the cobalt or nickel salts of the decamolybdocobaltate dimeric ion of the formula $Co_2Mo_{10}O_{38}H_4^{6-}$, $3Co^{2+}$ or $Co_2Mo_{10}O_{38}H_4^{6-}$, $3Ni^{2+}$ having an atomic ratio of the said promoter (Co and/or Ni)/Mo of 0.5, the cobalt or nickel salts of the 6-molybdonickellate ion of the formula $NiMo_6O_{24}H_6^{4-}$, $2Co^{2+}$ or $NiMo_6O_{24}H_6^{4-}$, $2Ni^{2+}$ having an atomic ratio of the said promoter (Co and/or Ni)/Mo of 0.5, and the cobalt or nickel salts of the decamolybdonickellate dimeric ion of the formula $Ni_2Mo_{10}O_{38}H_4^{8-}$, $4Co^{2+}$ or $Ni_2Mo_{10}O_{38}H_4^{8-}$, $4Ni^{2+}$ having an atomic ratio of the said promoter (Co and/or Ni)/Mo of 0.6.

Other preferred polyoxometalates which may be advantageously used as active phase precursors of the catalyst implemented in the process according to the invention are the Keggin heteropolyanions of general formula $XM_{12}O_{40}^{q-}$ for which the m/x ratio is equal to 12, and the lacunary Keggin heteropolyanions of general formula $XM_{11}O_{39}^{q-}$ for which the m/x ratio is equal to 11 and wherein the elements X and M and the charge q have the meanings given above. X is thus an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), and q being an integer within the range 1 to 20 and preferably 3 to 12.

The said Keggin species are advantageously obtained for variable pH ranges according to the pathways for obtaining them described in the publication of A. Griboval, P. Blanchard, E. Payen, M. Fournier, and J. L. Dubois, Chem. Lett., 1997, 12, 1259.

The preferred Keggin type heteropolyanions are selected from the heteropolyanions of the formula $HPCoMo_{11}O_{40}^{6-}$ and $Mo_{12}O_{40}^{3-}$.

The highly preferred Keggin heteropolyanion is the heteropolyanion of the formula $Mo_{12}O_{40}^{3-}$.

A highly preferred heteropolyanion is the Keggin heteropolyanion in its heteropolyacid form of the formula $PMo_{12}O_{40}^{3-}$, $3H^+$.

In the said Keggin type heteropolyanions of the above formula, at least one atom of molybdenum is substituted with a nickel atom, a cobalt atom, or with at least one atom of vanadium respectively.

The said heteropolyanions mentioned above are described in the publications of L. G. A. van de Water, J. A. Bergwerff, Bob, G. Leliveld, B. M. Weckhuysen, and K. P. de Jong, J. Phys. Chem. B, 2005, 109, 14513 and de D. Soogund, P. Lecour, A. Daudin, B. Guichard, C. Legens, C. Lamonier, and E. Payen in Appl. Catal. B, 2010, 98, 1, 39.

Salts of Keggin or lacunary Keggin type heteropolyanions may similarly be advantageously used as active phase precursors according to the invention. Salts of preferred Keggin or lacunary Keggin type heteropolyanion or heteropolyacids are advantageously selected from the cobalt or nickel salts of phosphomolybdic, silicomolybdic, phosphotungstic or silicitungstic acids. The said salts of Keggin or lacunary Keggin type heteropolyanion or heteropolyacids are described in U.S. Pat. No. 2,547,380. Preferably, a Keggin type heteropolyanion salt is cobalt molybdate of the formula $3/2Co^{2+}$, $PMo_{12}O_{40}^{3-}$ having an atomic ratio of the group VI metal to the group VIII metal, that is Co/Mo, of 0.125.

Other salts of Keggin or lacunary Keggin type heteropolyanions or heteropolyacids that may be advantageously used as active phase precursors according to the invention are the heteropolyanion or heteropolyacid salts of general formula $Z_xXM_{12}O_{40}$ (or $xZ^{p+}$, $XM_{12}O_{40}^{p.x-}$, formula manifesting the counterion $Z^{p+}$), wherein Z is cobalt and/or nickel, X is phosphorus, silicon or boron and M is molybdenum and/or tungsten, x takes the value of 2 or more if X is phosphorus, of 2.5 or more if X is silicon and of 3 or more if X is boron. Such salts of Keggin or lacunary Keggin type heteropolyanions or heteropolyacids are described in French Patent 2749778. These structures offer the particular benefit as compared with the structures described in U.S. Pat. No. 2,547,380 of achieving higher atomic ratios of the group VIII element to the element of group VI, in particular higher than 0.125.

This increase in the said ratio is obtained by reducing the said salts of Keggin or lacunary Keggin type heteropolyanion or heteropolyacids salts. Thus the presence of at least part of the molybdenum and/or of the tungsten is at a lower valence than its normal value of six such as results, for example, from the composition of phosphomolybdic, phosphotungstic, silicomolybdic or silicotungstic acid.

Higher atomic ratios of the group VIII element to the element of group VI are especially preferred to maximise the performances of the hydrotreatment catalysts and in particular of the hydrodesulphuration catalysts implemented in the process according to the invention.

The salts of Keggin type substituted heteropolyanions of the formula $Z_xXM_{11}O_{40}Z'C_{(z-2x)}$, wherein Z' is substituted for an M atom and wherein Z is cobalt and/or nickel, X is phosphorus, silicon or boron and M is molybdenum and/or tungsten, Z' is cobalt, iron, nickel, copper or zinc, and C is an $H^+$ ion or an alkylammonium cation, x takes the value of 0 to 4.5, z a value between 7 and 9; the said salts being described in French Patent 2764211 may similarly be advantageously used as active phase precursors according to the invention. Thus, the said salts of Keggin heteropolyanions correspond to those described in French Patent 2749778 but in which a Z' atom is substituted for an atom M. The said salts of substituted Keggin heteropolyanions are especially preferred because they lead to atomic ratios between the group VIII element and that of group VI of up to 0.5.

Other preferred polyoxometalates which may be advantageously used as active phase precursors of the catalyst implemented in the process according to the invention are the Strandberg heteropolyanions of the formula $H_hP_2Mo_5O_{23}^{(6-h)-}$, wherein h is equal to 0, 1 or 2 and for which the m/x ratio is equal to 5/2.

The preparation of the said Strandberg heteropolyanions is described in the article by de W-C. Cheng, N. P. Luthra, J. Catal., 1988, 109, 163. This has been demonstrated by J. A. Bergwerff, T. Visser, B. R. G. Leliveld, B. D. Rossenaar, K. P. de Jong, and B. M. Weckhuysen, Journal of the American Chemical Society 2004, 126, 44, 14548. An especially preferred Strandberg heteropolyanions [sic] used in the invention is the heteropolyanion of the formula $P_2Mo_5O_{23}^{6-}$.

Thus, through the use of different methods of preparation, numerous polyoxometalates and their associated salts are available, with variable promoter X/metal M ratios. Generally, all these polyoxometalates and their associated salts may be advantageously used for the preparation of the catalysts implemented in the process according to the invention. However, the above list is not exhaustive, and other combinations may be envisaged.

The use of polyoxometalates for the preparation of a catalyst implemented in the process according to the invention has numerous catalytic advantages. The said polyoxometalates which are oxide precursors combining within the same molecular structure at least one group VIB element, preferably molybdenum and/or tungsten and/or at least one group VIII element, preferably cobalt and/or nickel, give rise, following sulphuration, to catalysts the catalytic performances of which are improved due to a better promotion effect, that is, a better synergy between the group VIB element and the group VIII element.

In the case wherein the catalyst implemented in the process according to the invention comprises a group VIB element, the said catalyst preferably comprises a content by mass of the group VIB element, expressed as wt. % of oxide relative to the total mass of the catalyst, within the range 1 to 25 wt. %, and preferably within the range 2.5 to 22 wt. %.

The said contents are the total contents of group VIB element whatever the form of the said group VIB element present in the said catalyst and optionally whatever its mode of introduction. The said contents are thus representative of the content of group VIB element present either in the form of at least one polyoxometalate within the mesostructured silicon oxide matrix, or in any other form depending on its mode of introduction, such as for example in the oxide form.

In the case wherein the catalyst implemented in the process according to the invention comprises a group VIII element, the said catalyst preferably comprises content by mass of the group VIII element expressed in percentage by weight of oxide relative to the total mass of the catalyst within the range 0.1 to 10 wt. % and preferably within the range 1 to 7 wt. %.

The said contents are the total contents of group VIII elements whatever the form of the said group VIII element present in the said catalyst and as applicable whatever its mode of introduction. The said contents are thus representative of the content of group VIII element present either in the form of at least one polyoxometalate within the mesostructured silicon oxide matrix whether in position M or in position X, or present in counterion form and/or optionally added at different stages in the preparation of the said mesostructured silicon oxide matrix as described below, or in any other form depending on its mode of introduction, such as for example in the oxide form.

In the case wherein the catalyst implemented in the second stage of hydrodesulphuration of the process according to the invention comprises a doping element selected from phosphorus, boron and silicon, the said catalyst comprises a content by mass of doping element selected from phosphorus, boron and silicon, expressed in percentage by weight of oxide relative to the total mass of the catalyst, within the range 0.1 to 10 wt. %, preferably 0.5 to 8 wt. %, and yet more preferably 0.5 to 6 wt. % of oxide relative to the final catalyst.

The said contents are the total contents of doping elements selected from phosphorus, boron and silicon whatever the form of the said doping element present in the said catalyst and whatever its mode of introduction. The said contents are thus representative both of the content of the doping element selected from phosphorus, boron and silicon present in the form of at least one polyoxometalate within the mesostructured silicon oxide matrix in position X and/or optionally added at different stages in the preparation of the said mesostructured silicon oxide matrix as described below, or in any other form depending on its mode of introduction, such as for example in the oxide form.

According to the invention, the said polyoxometalates defined above are present within a mesostructured silicon oxide matrix having a pore size within the range 1.5 to 50 nm and having amorphous walls of thickness within the range 1 to 30 nm and preferably 1 to 10 nm.

Mesostructured oxide matrix is understood within the meaning of the present invention as an inorganic solid having a porosity organised on the scale of the mesopores of each of the elementary particles constituting the said solid, that is, a porosity organised on the scale of pores of uniform size within the range 1.5 to 50 nm and preferably 1.5 to 30 nm and yet more preferably 4 to 16 nm, and homogeneously and regularly distributed within each of the said particles constituting the matrix. The matter located between the mesopores of each of the elementary particles of the oxide matrix of the precursor of the catalyst used in the process according to the invention is amorphous and forms sides or walls the thickness of which is within the range 1 to 30 nm and preferably 1 to 10 nm. The thickness of the walls corresponds to the distance separating one pore from another. The organisation of the mesoporosity described above leads to a structuring of the oxide matrix which may be hexagonal, vermicular or cubic and preferably hexagonal.

Generally, the said "mesostructured" materials are advantageously obtained by methods of synthesis called "soft chemistry" (G. J. de A. A. Soler-Illia, C. Sanchez, B. Lebeau and J. Patarin, Chem. Rev., 2002, 102, 4093) at low temperatures via la coexistence, in aqueous solution or in highly polar solvents, of inorganic precursors and structuring agents, generally ionic or neutral molecular or supramolecular surfactants. Control of the electrostatic interactions or by hydrogen bonds between the inorganic precursors and the structuring agent conjointly linked to hydrolyse/condensation reactions of the inorganic precursor leads to a cooperative assembly of the organic and inorganic phases generating micellar aggregates of surfactants of uniform size that is controlled within an inorganic matrix. This phenomenon of cooperative auto-assembly governed, inter alia, by the concentration of structuring agent may be induced by gradual evaporation of a solution of reactants the structuring-agent concentration of which is lower than the critical micellar concentration, or else via the precipitation or direct gelification of the solid when using a solution of precursors that has a higher reactant concentration.

Freeing of the porosity is then achieved by eliminating the surfactant, this being done conventionally by methods of chemical extraction, or by heat treatment.

A number of families of mesostructured materials have been developed, as a function of the nature of the inorganic precursors and of the structuring agent used, as well as of the operating conditions imposed. The M41S family consists of mesoporous materials obtained by the use of ionic surfactants such as quaternary ammonium salts having a generally hexagonal, cubic or lamellar structure, pores of uniform size within a range of 1.5 to 10 nm and amorphous walls of thickness of the order of 1 to 2 nm. The M41S family was initially developed by Mobil in the article by J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, and J. L. Schlenker, J. Am. Chem. Soc., 1992, 114, 27, 10834.

The family of materials known by the name SBA is characterised by the use of amphiphilic macromolecular structuring agents of the block copolymer type. These materials are characterised by a generally hexagonal, cubic or lamellar structure, pores of uniform size within a range of 4 to 50 nm and amorphous walls of thickness within a range of 3 to 7 nm.

The mesostructured oxide matrix used in the catalyst implemented in the process according to the invention is purely silica.

The mesostructured silicon oxide matrix used in the catalyst implemented in the process according to the invention is advantageously a mesostructured matrix belonging to the M41S family or to the SBA family of materials.

Preferably, the said mesostructured silicon oxide matrix is a matrix of the type SBA-15.

According to the invention, the said polyoxometalates defined above are present within a mesostructured silicon oxide matrix. More precisely, the said polyoxometalates present within the said mesostructured silicon oxide matrix are trapped actually within the said matrix. Preferably, the said polyoxometalates are present in the walls of the said mesostructured matrix. Occlusion of the said polyoxometalates in the walls of the said mesostructured matrix is achievable by a method of synthesis termed direct, at the time of synthesis of the said matrix serving as a support by addition of desired polyoxometalates to the precursor reactants of the inorganic oxide lattice of the matrix.

The said mesostructured silicon oxide matrix comprising the said polyoxometalates trapped in its walls implemented in the process according to the invention is advantageously prepared exclusively by direct synthesis.

More precisely, the said mesostructured silicon oxide matrix is advantageously obtained according to a method of preparation comprising: a) a step of formation of at least one polyoxometalate of the formula given above according to a method known to the person skilled in the art, b) a step of mixing in solution at least one surfactant, at least one silica precursor, then at least one polyoxometalate obtained according to step a) to obtain a colloidal solution, c) a step of maturation of the said colloidal solution obtained at the end of step b) in time and in temperature; d) an optional step of autoclaving of the suspension obtained at the end of step c), e) a step of filtration of the suspension obtained at the end of step c) and following optional passage into the autoclaving step, of washing and drying of the solid thus obtained, f) a step of eliminating the said surfactant leading to generation of the uniform and organised mesoporosity of the mesostructured matrix, g) an optional step of treatment of the solid obtained at the end of step f) in order to partially or wholly regenerate the polyoxometalate entity that may have been partially or totally degraded during step f) and h) a step of optional drying of the said solid thus obtained consisting of the said mesostructured silicon oxide matrix comprising the said polyoxometalates trapped in its walls.

Step a) of formation of at least one polyoxometalate of the formula given above is advantageously implemented according to a method known to the person skilled in the art. Preferably, the polyoxometalates described above, and their associated methods of preparation are used in the method of preparation of the said mesostructured silicon oxide matrix comprising the said polyoxometalates trapped in its walls.

Step b) of the said method of preparation consists in mixing, in solution, at least one surfactant and at least one silica precursor, then at least one polyoxometalate obtained according to step a) to obtain a colloidal solution.

Preferably, at least one surfactant and at least one silica precursor are mixed in solution for a duration within the range 15 minutes to 1 hour, then at least one polyoxometalate obtained according to step a) in admixture in a solution of the same nature and preferably the same solution is added to the previous solution to obtain a colloidal solution.

Mixing step b) is performed with agitation at a temperature within the range 25° C. to 80° C. and preferably within the range 25° C. to 50° C. for a duration within the range 5 minutes to 2 h and preferably 30 minutes to 1 h.

The solution in which are mixed at least one surfactant, at least one polyoxometalate obtained according to step a) and at least one silica precursor conforming to step b) of the said method of preparation may advantageously be acidic, basic or neutral. Preferably, the said solution is acidic or neutral. The acids used to obtain an acidic solution are advantageously selected from hydrochloric acid, sulphuric acid and nitric acid. The said solution may advantageously be aqueous or may advantageously be a mixture of water and organic solvent, the organic solvent preferably being a polar solvent, preferably an alcohol, and more preferably, the solvent is ethanol. The said solution may also be advantageously practically organic, preferably practically alcoholic, the quantity of water being such that the hydrolysis of the inorganic precursors is assured. The quantity of water is thus preferably stoichiometric. Very preferably, the said solution is an acidic aqueous solution.

The surfactant used for preparing the mixture in step b) of the said method of preparation is an ionic or non-ionic surfactant, or a mixture of the two. Preferably, the ionic surfactant is selected from the ions phosphonium and ammonium and highly preferentially from the quaternary ammonium salts such as cetyltrimethylammonium bromide (CTAB). Preferably, the non-ionic surfactant may be any copolymer having at least two parts of differing polarities conferring upon them amphiphilic macromolecular properties. These copolymers may comprise at least one block forming part of the non-exhaustive list of families of the following polymers: the fluorinated polymers (—[$CH_2$—$CH_2$—$CH_2$—$CH_2$—O—CO—R1- where R1=$C_4F_9$, $C_8F_{17}$, etc.), the biological polymers such as the amino polyacids (poly-lysine, alginates, etc.), the dendrimers, the polymers consisting of chains of poly(alkylene oxide). In general, any copolymer of amphiphilic character known to the person skilled in the art may be used (S. Förster and M. Antionnetti, Adv. Mater, 1998, 10, 195; S. Förster and T. Plantenberg, Angew. Chem. Int. Ed, 2002, 41, 688; H. Cölfen, Macromol. Rapid Commun, 2001, 22, 219). Preferably, a block copolymer consisting of chains of poly(alkylene oxide) is used. The said block copolymer is preferably a block copolymer having two, three or four blocks, each block consisting of a poly(alkylene oxide) chain. For a two-block copolymer, one of the blocks consists of a poly(alkylene oxide) chain of a hydrophilic nature and the other block consists of a poly(alkylene oxide) chain of a hydrophobic nature. For a three-block copolymer, at least one of the blocks consists of a poly(alkylene oxide) chain of a hydrophilic nature, while the other at least one block consists of a poly(alkylene oxide) chain of a hydrophobic nature. Preferably, in the case of a three-block copolymer, the poly (alkylene oxide) chains of a hydrophilic nature are poly(ethylene oxide) chains denoted $(PEO)_x$ and $(PEO)_z$, and the poly(alkylene oxide) chains of a hydrophobic nature are poly (propylene oxide) chains denoted $(PPO)_y$, poly(butylene oxide) chains, or mixed chains each of which is a mixture of a plurality of monomers of alkylene oxide. In the case of a three-block copolymer, a compound of the formula $(PEO)_x$—$(PPO)_y$—$(PEO)_z$ is highly preferably used, wherein x is within the range 5 to 300 and y is within the range 33 to 300 and z is within the range 5 to 300. Preferably, the values of x and z are identical. Highly advantageously, a compound wherein x=20, y=70 and z=20 (P123) and a compound wherein x=106, y=70 and z=106 (F127) are used. The commercial non-ionic surfactants known by the names Pluronic (BASF), Tetronic (BASF), Triton (Sigma), Tergitol (Union Carbide), and Brij (Aldrich) are usable as non-ionic surfactants. For a four-block copolymer, two of the blocks consist of a poly(alkylene oxide) chain of a hydrophilic nature and the other two blocks consist of a poly(alkylene oxide) chain of a hydrophobic nature. Preferably, for preparing the mixture of step b) of the said method of preparation, the mixture of an ionic surfactant such as CTAB and a non-ionic surfactant such as P123 are preferably used.

As the mesostructured oxide matrix used in the catalyst implemented in the process according to the invention is purely silica, the silica precursor(s) used to form the mesostructured oxide matrix is(are) obtained from any source of silica and advantageously from a sodium silicate precursor of the formula $Na_2SiO_3$, a chlorinated precursor of the formula $SiCl_4$, an alkoxide precursor of the formula $Si(OR)_4$ wherein R═H, methyl or ethyl, or a chloroalkoxide precursor of the formula $Si(OR)_{4-x}Cl_x$ wherein R═H, methyl or ethyl, x being within the range 0 to 4. The silica precursor may also advantageously be an alkoxide precursor of the formula $Si(OR)_{4-x}R'_x$ wherein R═H, methyl or ethyl and R' is an alkyl chain or a alkyl chain functionalised, for example, with a thiol, amino, β-diketone or sulphonic acid group, x being within the range 0 to 4.

A preferred silica precursor is tetraethylorthosilicate (TEOS) of the formula $Si(OEt)_4$.

The polyoxometalates described above and having the general formula previously mentioned are used in step b) of the method of preparing the said mesostructured silicon oxide matrix comprising the said polyoxometalates trapped in its walls.

The preferred polyoxometalates used according to the invention are advantageously from the polyoxometalates of the formula $PMo_{12}O_{40}^{3-}$, $HPCoMo_{11}O_{40}^{6-}$, $P_2Mo_5O_{23}^{6-}$, $Co_2Mo_{10}O_{38}H_4^{6-}$, $CoMo_6O_{24}H_6^{4-}$, taken alone or in admixture.

Step c) of the said method of preparation consists in a maturation step, that is, a step of conservation, under agitation, of the said colloidal solution obtained at the end of step b) at a temperature within the range 25° C. to 80° C. and preferably within the range 25° C. to 40° C. for a duration within the range 1 h to 48 h and preferably 20 h to 30 h.

At the end of maturation step c), a suspension is obtained.

The optional step d) of the said preparation method consists in optionally autoclaving the suspension obtained at the end of step c). This step consists in placing the said suspension in a sealed chamber at a temperature within the range 80° C. to 140° C., preferably within the range 90° C. to 120° C. and more preferentially within the range 100° C. to 110° C. so as to work at autogenic pressure inherent to the operating conditions selected. The autoclaving is maintained for a duration within the range 12 to 48 hours and preferably 15 to 30 hours.

The suspension obtained at the end of step c) is then filtered according to step e) and the solid thus obtained is washed and dried. The washing of the said solid obtained after filtration and before drying is advantageously carried out with a solution of the same nature as the solution wherein are mixed at least one surfactant, at least one heteropolyanion and at least one silica precursor in conformity with step b) of the said preparation method, then with an aqueous solution of distilled water.

The drying of the said solid obtained after filtration and washing in the course of step e) of the said method of preparation is advantageously carried out in an oven at a temperature within the range 25° C. to 140° C., preferably 25° C. to 100° C. and preferably 30° C. to 80° C. during a period within the range 10 to 48 h and preferably within the range 10 to 24 h.

Step f) then consists of a step of elimination of the said surfactant, leading to the generation of the uniform and organised mesoporosity of the mesostructured matrix.

The elimination of the surfactant in the course of step f) of the said method of preparation in order to obtain the mesostructured matrix used according to the invention is advantageously performed by heat treatment, and preferably by calcination in air at a temperature within the range 300° C. to 1000° C. and preferably at a temperature within the range 400° C. to 600° C. during a period within the range 1 to 24 hours and preferably during a period within the range 6 to 20 hours.

Step f) is optionally followed by step g) of treatment of the solid in order to regenerate at least partially or wholly the polyoxometalate entity that may have been at least partially or totally degraded in step f). In the case of the said polyoxometalate being totally degraded in step f), the said regeneration step g) is obligatory. This step advantageously consists in washing of the solid with a polar solvent while using a Soxhlet type extractor. Preferably, the extraction solvent is selected from the alcohols, acetonitrile and water. Preferably the solvent is an alcohol and highly preferably the solvent is methanol. The said washing is carried out during a period within the range 1 to 24 hours, and preferably 1 to 8 hours at a temperature within the range 65 to 110° C. and preferably within the range 90 to 100° C.

Extraction with the polar solvent makes it possible not only to reform the said polyoxometalates trapped in the walls of the said matrix but also to eliminate the said polyoxometalates that may have formed at the surface of the said matrix.

In the case wherein step g) is obligatory, the said step g) is followed by step h). Step h) consists in a step of drying of the said solid thus obtained, the said solid consisting of the said mesostructured silicon oxide matrix comprising the said polyoxometalates trapped in its walls. The drying of the said solid is advantageously performed in an oven or in a drying cupboard at a temperature within the range 40° C. to 140° C.

preferably 40° C. to 100° C. and for a duration within the range 10 to 48 h and preferably 10 to 24 h.

The said mesostructured silicon oxide matrix comprising the said polyoxometalates trapped in its walls that is implemented in the process according to the invention advantageously has a specific surface area within the range 100 to 1000 m$^2$/g and highly advantageously within the range 300 to 500 m$^2$/g.

The said mesostructured oxide matrix comprising the said polyoxometalates trapped in its walls, that is, the catalyst in its oxide form, exhibits a form of each of the elementary particles of which it is composed that is non-homogeneous, that is, an irregular and preferably non-spherical shape. The said elementary particles constituting the said matrix comprising the said polyoxometalates trapped in its walls are preferably non-spherical.

At the end of the method of preparation by direct synthesis, the said elementary particles constituting the said matrix comprising the said polyoxometalates trapped in its walls advantageously present a mean size within the range 50 nm to 10 microns and preferably within the range 50 nm to 1 micron.

Other elements may advantageously be added at different stages in the preparation of the said mesostructured silicon oxide matrix used in the invention. The said elements are preferably selected from the group VIII elements called promoters, the doping elements and the organic compounds. Highly preferably, the said group VIII metal is selected from nickel and cobalt and more preferably, the group VIII metal consists uniquely of cobalt or nickel. Still more preferably, the group VIII metal is cobalt. The doping elements are preferably selected from boron, silicon, phosphorus and fluorine.

The said elements may advantageously be added alone or in admixture in the course of one or more steps of the method of preparing the said matrix selected from steps i), ii), iii) and iv) below.

i) The said elements may advantageously be introduced during step b) of mixing in solution of at least one surfactant, of at least one silica precursor, then of at least one polyoxometalate obtained according to step a) to obtain a colloidal solution, of the method of preparing the said matrix.

ii) The said elements may advantageously be introduced after step f) and before step g) of the said preparation method. The said elements may advantageously [be] introduced by any technique known to the person skilled in the art and advantageously by dry impregnation.

iii) The said elements may be advantageously introduced after drying step h) of the said preparation method prior to forming. The said elements may advantageously be introduced by any technique known to the person skilled in the art and advantageously by dry impregnation.

iv) The said elements may be introduced after the step of forming of the said matrix. The said elements may advantageously be introduced by any technique known to the person skilled in the art and advantageously by dry impregnation.

After each of steps ii) iii) or iv) described above, the solid obtained consisting of the said mesostructured silicon oxide matrix comprising the said polyoxometalates trapped in its walls may advantageously undergo a drying step and optionally a step of calcination in optionally O$_2$— enriched air at a temperature within the range 200 to 600° C. and preferably within the range 300 to 500° C. for a duration within the range 1 to 12 hours and preferably for a duration within the range 2 to 6 hours.

The sources of group VIII elements that may advantageously be used are well known to the person skilled in the art.

The nitrates preferably selected from cobalt nitrate and nickel nitrate, the sulphates, the hydroxides selected from the cobalt hydroxides and the nickel hydroxides, the phosphates, the halogenides selected from the chlorides, the bromides and the fluorides, the carboxylates selected from the acetates and the carbonates may advantageously be used as sources of group VIII elements.

The group VIII promoter elements are advantageously present in the catalyst in contents within the range 0.1 to 10 wt. %, preferably 1 to 7 wt. % of oxide with reference to the final catalyst. The said contents are the total contents of group VIII element, whatever the form of the said group VIII element present in the said catalyst and whatever its mode of introduction. The said contents are thus representative both of the content of group VIII element present in the form of at least one polyoxometalate within the mesostructured silicon oxide matrix, and of the content of group VIII element added at different stages in the preparation of the said mesostructured silicon oxide matrix.

The doping elements that may advantageously be introduced are advantageously selected from boron, silicon, phosphorus and fluorine taken alone or in admixture.

The doping element is an added element which has no catalytic character per se, but which increases the catalytic activity of the metal(s).

The said doping element may be advantageously introduced alone or in admixture during the synthesis of the said material used in the invention. It may also be introduced by impregnation of the material used according to the invention before or after drying, before or after re-extraction. Finally, the said dopant may be introduced by impregnation of the said material used in the invention after forming.

The doping elements are advantageously present in the catalyst used according to the present invention in a content within the range 0.1 to 10 wt. %, preferably 0.5 to 8 wt. %, and yet more preferably 0.5 to 6 wt. % of oxide with reference to the final catalyst. The said contents are the total contents of doping element, whatever the form of the said doping element present in the said catalyst and whatever its mode of introduction. The said contents are thus representative both of the content of element X present in the form of at least one polyoxometalate within the mesostructured silicon oxide matrix, and of the content of doping element added at different stages in the preparation of the said mesostructured silicon oxide matrix.

The source of boron may advantageously be boric acid, preferably orthoboric acid H$_3$BO$_3$, ammonium diborate (sic) or pentaborate, boric oxide, and the boric esters. Boron may also be introduced at the same time as the group VIB element(s) in the form of Keggin heteropolyanions, lacunary Keggin-type heteropolyanions, substituted Keggin heteropolyanions, such as, for example, in the form of boromolybdic acid and the salts thereof, or borotungstic acid and the salts thereof during the synthesis of the said matrix. Boron, when not introduced during the synthesis of the said matrix, but post-impregnation, may be advantageously introduced for example with a solution of boric acid in a water/alcohol mixture, or in a water/ethanolamine mixture. Boron may also be advantageously introduced in the form of a mixture of boric acid, oxygenated water and a basic organic compound containing nitrogen, such as ammonia, the primary and secondary amines, the cyclic amines, the compounds of the pyridine and quinoline family and the compounds of the pyrrole family.

The source of phosphorus may advantageously be orthophosphoric acid H$_3$PO$_4$, the corresponding salts and esters or the ammonium phosphates. Phosphorus may also be advantageously introduced at the same time as the group VIB element(s) in the form of Keggin heteropolyanions, lacunary Keggin-type heteropolyanions, substituted Keggin heteropolyanions, or Strandberg-type heteropolyanions such as, for example, in the form of phosphomolybdic acid and the salts thereof, or phosphotungstic acid and the salts thereof during the synthesis of the said matrix. Phosphorus, when not introduced during the synthesis of the said matrix, but post-impregnation, may be advantageously introduced in the form of a mixture of phosphoric acid and a basic organic compound containing nitrogen, such as ammonia, the primary and secondary amines, the cyclic amines, the compounds of the pyridine and quinoline family and the compounds of the pyrrole family.

The sources of fluorine that may be advantageously used are well known to the person skilled in the art. For example, the fluoride anions may be introduced in the form of hydrofluoric acid or the salts thereof. These salts are formed with alkali metals, ammonium or an organic compound. In the latter case, the salt is advantageously formed in the reaction mixture by reaction between the organic compound and the hydrofluoric acid. Fluorine, when not introduced during the synthesis of the said matrix, but post-impregnation, may be advantageously introduced for example by impregnation of an aqueous solution of hydrofluoric acid, or of ammonium fluoride or ammonium difluoride.

Once the doping element has been introduced post-impregnation, the person skilled in the art may advantageously proceed to drying, for example at 120° C., and optionally thereafter to calcination preferably in air on a current-carrying bed, for example at 450° C. for 4 hours.

The added organic compounds are preferably selected from the chelating agents, the non-chelating agents, the reducing agents and the additives known to the person skilled in the art. The said organic compounds are advantageously selected from the optionally etherified mono-, di- or polyalcohols, the carboxylic acids, the sugars, the non-cyclic mono-, di- or polysaccharides such as glucose, fructose, maltose, lactose or sucrose, the esters, the ethers, the crown ethers, compounds containing sulphur or nitrogen, such as nitriloacetic acid, ethylenediaminetetraactic acid, or diethylenetriamine.

The said mesostructured silicon oxide matrix comprising the said polyoxometalates trapped in its walls and serving as a support for the catalyst may be obtained in the form of a powder, beads, pellets, granules or extrudates, the forming operations being performed according to the conventional techniques known to the person skilled in the art. Preferably, the said mesostructured silicon oxide matrix used according to the invention is obtained in powder form and used having been formed into extrudates or beads.

During these forming operations, it is also possible to add to the said mesostructured silicon oxide matrix comprising the said polyoxometalates trapped in its walls, at least one porous oxide material preferably selected from the group formed by alumina, silica, la silica-alumina, magnesium, clay, titanium oxide, zirconium oxide, lanthanum oxide, cerium oxide, the aluminium phosphates, the boron phosphates, or a mixture of at least two of the oxides mentioned above and the alumina-boron oxide combinations, the alumina-titanium mixtures, alumina-zirconia and titanium-zirconia. It is also possible to add the aluminates, such as for example the aluminates of magnesium, calcium, barium, manganese, iron, cobalt, nickel, copper and zinc, the mixed aluminates, such as for example those containing at least two of the metals mentioned above. It is also advantageously possible to add the titanates, such as for example the titanates of zinc, nickel and cobalt. It is also advantageously possible to use mixtures of alumina and silica and mixtures of alumina with other compounds such as, for example, the elements of group VIB, phosphorus, fluorine or boron. It is also possible to use simple synthetic or natural clays of the type 2:1 dioctahedric phyllosilicate or 3:1 trioctahedric phyllosilicate such as kaolinite, antigorite, chrysotile, montmorillonnite, beidellite, vermiculite, talc, hectorite, saponite, laponite. These clays may optionally be delaminated. It is also advantageously possible to use mixtures of alumina and clay and mixtures of silica-alumina and clay.

The said mesostructured silicon oxide matrix comprising the said polyoxometalates trapped in its walls is characterised by a plurality of analytical methods and notably by small-angle X-ray diffraction (small-angle XRD), wide-angle X-ray diffraction (XRD), nitrogen volumetry (BET), transmission electron microscopy (TEM) optionally linked to X-ray analysis, scanning electron microscopy (SEM), X-ray fluorescence (XRF) and by any technique known to the person skilled in the art for characterising the presence of polyoxometalates such as spectroscopy in particular Raman, UV-visible or infra-red spectroscopy, as well as microanalyses. Methods such as nuclear magnetic resonance (NMR), or electron paramagnetic resonance (EPR) (notably with the use of reduced heteropolyanions) may also be used according to the type of heteropolyanions employed.

At the end of the preparation method described above, the catalyst presents, in its oxide form, in the form of a solid consisting of a mesostructured silicon oxide matrix comprising the said polyoxometalates trapped in its walls.

According to the invention, the said catalyst in its oxide form is sulphured before being implemented in the hydrodesulphuration process according to the invention.

This sulphuration step generates the sulphured active phase. Indeed, the transformation of at least one polyoxometalate trapped in the mesostructured oxide matrix into its associated sulphured active phase is advantageously achieved by sulphuration, that is, by a treatment at the temperature of the said matrix in contact with an organic sulphur compound that is degradable and generates $H_2S$, or directly in contact with a stream of $H_2S$ diluted in $H_2$ at a temperature within the range 200 to 600° C. and preferably within the range 300 to 500° C. according to methods well known to the person skilled in the art. More precisely, the sulphuration is performed 1) in an actual unit of the process with the aid of a hydrocarbon feed of the virgin olefin gasoline type in the presence of hydrogen and of hydrogen sulphide ($H_2S$) introduced as is or as the degradation product of an organic sulphur compound, this being called sulphuration in-situ or 2) before the catalyst is fed into the unit, called sulphuration ex-situ. In the case of sulphuration ex-situ, mixtures of gases may be advantageously implemented, such as the mixtures $H_2/H_2S$ or $N_2/H_2S$. The catalyst in its oxide form may also be advantageously sulphured ex-situ starting with model compounds in the liquid phase, the sulphuring agent then being selected from dimethyl disulphide (DMDS), dimethyl sulphide, n-butyl mercaptan, the polysulphide compounds of the type tertiononyl polysulphide, the latter being diluted in an organic matrix composed of aromatic or alkyl molecules.

Prior to the said sulphuration step, the said catalyst in its oxide form consisting of a mesostructured silicon oxide matrix comprising the said polyoxometalates trapped in its walls may be advantageously pretreated thermally according to methods well known to the person skilled in the art, preferably by calcination in air at a temperature within the range 300 to 1000° C. and preferably a temperature within the range 500 to 600° C. for a duration within the range 1 to 24 hours and preferably for a duration within the range 6 to 15 hours.

According to a preferred embodiment, the polyoxometalates trapped in the walls of the said mesostructured silicon oxide matrix may advantageously be partially or totally sulphured at the moment of the preparation method by direct synthesis of the said mesostructured silicon oxide matrix comprising the said polyoxometalates used according to the invention and preferably in the course of step b) of the said preparation method, by introducing into the solution, in addition to at least one surfactant, at least one polyoxometalate and at least one silica precursor, sulphured precursors advantageously selected from thiourea, thioacetamide, the mercaptans, the sulphides and the disulphides. Low-temperature degradation, that is, at a temperature within the range 80 to 90° C. of the said sulphur precursors, either during the maturation step c) or during the autoclaving step d) induces the formation of $H_2S$, thus enabling the sulphuration of the said polyoxometalates.

According to another preferred embodiment, the partial or total sulphuration of the said polyoxometalates may be advantageously carried out by introducing the said sulphur precursors into step g) of partial or total regeneration of the said polyoxometalates trapped in the said mesostructured silicon oxide matrix of the catalyst used in the invention.

The catalyst implemented in the hydrodesulphuration process according to the invention may advantageously be used in any process known to the person skilled in the art enabling the desulphuration of hydrocarbon cuts, and preferably catalytic cracking gasoline cuts. The hydrodesulphuration process according to the invention may advantageously be implemented in any type of fixed-bed, moving-bed or bubbling-bed reactor. Preferably, the said hydrodesulphuration process is implemented in a fixed-bed reactor.

EXAMPLES

The examples which follow clarify the invention without, however, limiting the scope thereof.

Example 1 (Non-Conforming)

Preparation of a Catalyst A1 Having an Active Phase Based on Cobalt and Molybdenum Deposited by Dry Impregnation of a Type SBA-15 Mesostructured Silica Support with a Solution Containing the Corresponding Classical Molecular Precursors A type SBA-15 mesostructured silica material is synthesised in conformity with the teaching of the publication of D. Zhao, J. Feng, Q. Huo, N. Melosh, G. H. Frederickson, B. F. Chmelka, and G. D. Stucky, Science, 1998, 279, 548, in the following manner:

2 g of Pluronic surfactant $P_{123}$ ($PEO_{20}PPO_{70}PEO_{20}$) is dispersed in 15 ml water and 60 ml of a 2 M hydrochloric acid solution with agitation. 4.25 g of silica precursor tetraethyl orthosilicate (TEOS) of formula $Si(OEt)_4$, is added to the homogeneous solution, and the whole is left under agitation at 40° C. for 24 hours. The suspension thus obtained is then poured into a 250-ml teflon autoclave and left at 100° C. for 24 hours. The solid is then filtered. The powder is then dried in air at 100° C., then calcined at 550° C. in air for 4 h to degrade the copolymer and thus free the porosity. The solid obtained has the following textural properties and in particular specific surface area, pore volume, and pore diameter of 670 $m^2$/g, 0.9 ml/g, and 6.3 nm respectively. The catalyst A1 is prepared according to the method consisting of dry impregnation of an aqueous solution prepared on the basis of ammonium heptamolybdate and cobalt nitrate, the volume of the solution containing the metal precursors being strictly equal to the pore volume of the support mass. The precursor concentrations of the aqueous solution are adjusted so as to deposit the desired contents by weight onto the support. The catalyst is then dried for 12 hours at 120° C., then calcined in air at 500° C. for 2 hours.

The catalyst A1, thus obtained in the oxide state, has a molybdenum content of 20.2 expressed in wt. % of molybdenum trioxide ($MoO_3$) and a cobalt content of 5.4 expressed in wt. % of cobalt oxide CoO. The atomic ratio Co/Mo of this catalyst is 0.49. This catalyst does not conform to the invention. Catalyst A1 obtained was analysed by Raman spectroscopy. No characteristic band of the presence of a heteropolyanion is detected.

Example 2 (Non-Conforming)

Preparation of a Catalyst A2 of the Formulation CoMoP Based on Cobalt, Molybdenum and Phosphorus Deposited by Dry Impregnation of a Type SBA-15 Mesostructured Silica Support with a Solution Containing the Keggin Heteropolyacid of the Formula $PMo_{12}O_{40}^{3-}$, $3H^+$ A type SBA-15 mesostructured silica material is synthesised as in Example 1. The solid obtained has the following textural properties and in particular specific surface area, pore volume, and pore diameter of 670 $m^2$/g, 0.9 ml/g, and 6.3 nm respectively. The catalyst A2 is prepared according to the method consisting of dry impregnation with an aqueous solution containing the Keggin heteropolyacid of the formula $PMo_{12}O_{43}^{3-}$, $3H^+$, i.e. phosphomolybdic acid. The Keggin heteropolyacid of the formula $PMo_{12}O_{43}^{3-}$, $3H^+$ was purchased from Aldrich.

The volume of the solution containing the metal precursors is strictly equal to the pore volume of the support mass.

This solution is prepared in the following way:
a) Solubilisation of the Keggin heteropolyacid $PMo_{12}O_{43}^{3-}$, $3H^+$ is achieved under agitation for a few minutes at ambient temperature.
b) Cobalt carbonate (purity 99% by mass) is then introduced in small quantities as a precaution to avoid any exothermic reaction and any uncontrolled effervescence; dissolution of the carbonate is immediate.

The Raman spectrum of the prepared solution clearly shows the characteristic bands of the salts in solution.

The concentrations of precursor in the aqueous solution are adjusted so as to deposit the desired contents by weight on the support. The catalyst is then dried for 12 hours at 120° C.

Catalyst A2 thus obtained in the oxide state, of the formulation CoMoP, has a molybdenum content of 21.5 expressed in wt. % of molybdenum trioxide ($MoO_3$), a cobalt content of 5.7 expressed in wt. % of cobalt oxide (CoO) and a phosphorus content of 0.9 expressed in wt. % of oxide ($P_2O_5$). The atomic ratio Co/Mo of this catalyst is 0.50 and the molar ratio P/Mo is 0.08. This catalyst does not conform to the invention. The catalyst A2 obtained was analysed by Raman spectroscopy which reveals the bands at 994 $cm^{-1}$, 975 $cm^{-1}$, 895 cm$^{-1}$ and 605 cm$^{-1}$ that are characteristic of the presence of the Keggin heteropolyanion of formula PMo$_{12}$O$_{40}$$^{3-}$.

Example 3 (Conforming)

Preparation of a Catalyst B Conforming to the Invention, Comprising the Keggin Heteropolyacid of Formula PMo$_{12}$O$_{40}$$^{3-}$, 3H$^{+}$ Trapped in a Type SBA-15 Mesostructured Silica Matrix The Keggin heteropolyacid of the formula PMo$_{12}$O$_{40}$$^{3-}$, 3H$^{+}$ was purchased from Aldrich.

The SBA-15 mesostructured silica matrix comprising the Keggin heteropolyanion of the formula PMo$_{12}$O$_{40}$$^{3-}$, 3H$^{+}$ trapped in its walls is obtained by direct synthesis according to the following method of preparation:

0.1 g cetyltrimethylammoniuim bromide (CTAB) surfactant and 2.0 g Pluronic P$_{123}$ surfactant (PEO$_{20}$PPO$_{70}$PEO$_{20}$) are dissolved in 62.5 g of a 1.9 mol/l hydrochloric acid solution. 4.1 g of silica precursor tetraethyl orthosilicate (TEOS) of the formula Si(OEt)$_4$ is then added, then the medium is agitated for 45 min. 0.352 g of the Keggin heteropolyacid of the formula PMo$_{12}$O$_{40}$$^{3-}$, 3H$^{+}$ is then added in 10 g of the same hydrochloric acid solution. The colloidal solution obtained is then left under agitation for 20 hours at 40° C. The suspension is decanted into a teflon-coated autoclave for a treatment at a temperature of 100° C. for 24 hours. The suspension thus obtained is filtered, then the solid, after washing with 30 ml of the 1.9 mol/l hydrochloric acid solution and 60 ml of distilled water, is dried overnight in the drying cupboard at 40° C. The solid obtained is then calcined at a temperature level of 490° C. for 19 hours in order to eliminate the surfactants and free the mesoporosity of the said solid.

The solid obtained is then introduced into an extractor of the Soxhlet type and the system is brought to reflux in the presence of methanol for 4 hours so as to partially regenerate the heteropolyanion partially degraded during the step of calcination. The solid is then dried at a temperature of 90° C. for 12 hours to evacuate the solvent.

The solid obtained consisting of the SBA-15 mesostructured silica matrix comprising the Keggin heteropolyacid of formula PMo$_{12}$O$_{40}$$^{3-}$, 3H$^{+}$ trapped in its walls is then dry-impregnated with a solution of cobalt nitrate, then dried at 120° C. for 12 hours to evacuate the water. The final contents expressed in wt. % of oxides CoO, MoO$_3$ and P$_2$O$_5$ are respectively 5.4/20.6/0.8 relative to the total mass of the catalyst. The atomic ratio Co/Mo of the catalyst B is 0.50 and the molar ratio P/Mo is 0.08. The catalyst B has the following textural properties and in particular a specific surface area, a pore volume, and a pore diameter of 350 m$^2$/g, 0.9 ml/g, and 7.4 nm respectively and conforms to the invention.

The catalyst B obtained was analysed by Raman spectroscopy. This reveals a thin and relatively intense band at 990 cm$^{-1}$ and the secondary band at 602 cm$^{-1}$ that are characteristic of the Keggin 'heteropolyacid of formula PMo$_{12}$O$_{43}$$^{3-}$, 3H$^{+}$, in agreement with the earlier results published by A. Griboval, P. Blanchard, E. Payen, M. Fournier, and J. L. Duboís, Chem. Lett., 1997, 12, 1259.

Table 1 summarises the formulations of the catalysts conforming and non-conforming to the invention.

TABLE 1

Formulations of the catalysts conforming and non-conforming to the invention.

| Catalyst | Support | CoO (wt. %) | MoO$_3$ (wt. %) | P$_2$O$_5$ (wt. %) | Molar ratio Co/Mo | Molar ratio P/Mo |
|---|---|---|---|---|---|---|
| A1 (non-conforming) | SBA-15 | 5.2 | 20.4 | 0 | 0.49 | 0 |
| A2 (non-conforming) | SBA-15 | 5.7 | 21.5 | 0.9 | 0.51 | 0.08 |
| B (conforming) | SBA-15 | 5.4 | 20.6 | 0.8 | 0.50 | 0.08 |

Example 4

Comparison of the Test Catalysts on Model Molecules

A model feed representative of a catalytic cracking (FCC) gasoline containing 10 wt. % 2,3-dimethylbut-2-ene and 0.33 wt. % 3-methylthiophene (i.e. 1000 ppm of sulphur with reference to the feed) is used to evaluate the different catalysts. The solvent used is heptane. The catalysts in the form of a powder of particle size within the range 315 to 1000 microns are previously sulphured ex-situ in the gaseous phase at 500° C. for 2 h in a steam of H$_2$S in H$_2$ (15 vol. %).

The reaction is conducted in a sealed Grignard reactor under 3.5 MPa of hydrogen pressure, at 250° C. Samples are collected at different intervals of time and analysed by gas chromatography in order to observe the disappearance of the reactants.

The activity is expressed as a rate constant kHDS of the hydrodesulphuration reaction (HDS), normalised for the volume of catalyst in the oxide form, by positing an order 1 with reference to the other sulphur compounds. The selectivity is expressed as a normalised ratio of the rate constants k$_{HDS}$/k$_{HDO}$, k$_{HDO}$ being the rate constant for the reaction of olefin hydrogenation (HDO), normalised for the volume of catalyst in the oxide form, by positing an order 1 with reference to the olefins.

The values are normalised taking the catalyst A1 as the reference, and taking k$_{HDS}$/k$_{HDO}$=100 and k$_{HDS}$=100. The catalytic results are shown in Table 2.

TABLE 2

Performances in model feeds of the catalysts conforming and non-conforming to the invention.

| Catalyst | Support | Product | kHDS | kHDS/kHDO |
|---|---|---|---|---|
| A1 (non-conforming) | SBA-15 | CoMo | 100 | 100 |
| A2 (non-conforming) | SBA-15 | PMo$_{12}$O$_{40}$$^{3-}$ post-impregnation | 138 | 157 |
| B (conforming) | SBA-15 | PMo$_{12}$O$_{40}$$^{3-}$ trapped | 191 | 141 |

Impregnation of a mesoporous silica of type SBA-15 with a solution containing the Keggin heteropolyanion PMo$_{12}$O$_{40}$$^{3-}$ (catalyst A2, non-conforming) increases activity as compared with the reference catalyst A1, prepared without specific precautions, that is, by impregnating a solution containing the precursors of cobalt and molybdenum on the said silica. The selectivity is similarly very greatly improved as compared with the reference catalyst A1.

The trapping of the active phase in the form of the Keggin heteropolyanion $PMo_{12}O_{40}^{3-}$ (catalyst B, conforms) in the said mesostructured silicon oxide matrix greatly increases the activity as compared with the reference catalyst A1, and yields very good selectivity for the hydrodesulphuration reaction as compared with the reference catalyst A1.

Moreover, catalyst B conforming to the present invention, comprising the Keggin heteropolyanion $PMo_{12}O_{40}^{3-}$ trapped within the mesostructured silicon oxide matrix, also enables improved activity to be achieved as compared with the non-conforming catalyst A2, in which a solution containing the Keggin heteropolyanion $PMo_{12}O_{40}^{3-}$ is impregnated onto a mesostructured silicon oxide matrix, while retaining a similar selectivity for the dehydrosulphuration reaction.

The interactions between the active phase in the heteropolyanion form and the mesostructured inorganic silica lattice of the said matrix are manifested in a significant improvement in the selectivity for the olefin hydrodesulphuration reaction of catalyst B conforming to the invention, as compared with the catalysts A1, which do not conform.

The invention claimed is:

1. A hydrodesulphuration process of at least one gasoline cut implementing a catalyst comprising, in its oxide form, at least one metal from group VIB and/or at least one metal from group VIII of the periodic table present in the form of at least one polyoxometalate which is a Keggin heteropolyanion of the formula $XM_{12}O_{40}^{q-}$, or a lacunary Keggin heteropoylanion of the formula $XM_{11}O_{39}^{q-}$, wherein X is an element selected from phosphorus (P), silicon (Si), boron (B), nickel (Ni) and cobalt (Co), the said element being taken alone, M is one or more element(s) selected from molybdenum (Mo), tungsten (W), nickel (Ni) and cobalt (Co), O is oxygen, and q is an integer within the range 1 to 20, the polyoxometalate being present within a mesostructured silicon oxide matrix having a pore size within the range 1.5 to 50 nm and having amorphous walls of thickness within the range 1 to 30 nm, the catalyst being sulphured before being implemented in the process, and the catalyst in its oxide form exhibiting a form of each of the elementary particles of which it is composed that is non-spherical.

2. A process according to claim 1, wherein the gasoline cut is derived from a catalytic cracking unit.

3. A process according to claim 1, wherein the polyoxometalate is a Keggin heteropolyanion selected from the heteropolyanions of the formula $PCoMo_{11}O_{40}^{6-}$ and $PMo_{12}O_{40}^{3-}$.

4. A process according to claim 3, wherein the Keggin heteropolyanion is in its heteropolyacid form of the formula $PMo_{12}O_{40}^{3-}, 3H^+$.

5. A process according to claim 1, wherein the catalyst comprises a content by mass of the group VIB element, expressed as wt. % of oxide relative to the total mass of the catalyst, within the range 1 to 25 wt. %.

6. A process according to claim 1, wherein the said catalyst comprises a content by mass of the group VIII element, expressed as wt. % of oxide relative to the total mass of the catalyst, within the range 0.1 to 10 wt. %.

7. A process according to claim 1, wherein the catalyst comprises a content by mass of doping element X selected from phosphorus, boron and silicon within the range 0.1 to 10 wt. % of oxide with reference to the final catalyst.

8. A process according to claim 1, wherein active-phase promoters are added at different stages in the preparation of the said mesostructured silicon oxide matrix, the promoters being: promoters of the hydrogenating function selected from group VIII elements; doping elements; and organic compounds selected from optionally etherified mono-, di- or poly-alcohols, carboxylic acids, sugars, non-cyclic mono-, di- or polysaccharides, esters, ethers, crown ethers, nitriloacetic acid, ethylenediaminetetraactic acid and diethylenetriamine.

9. A process according to claim 1, wherein the process is implemented at a temperature within the range 250° C. to 350° C., at a total pressure within the range 1 MPa to 3 MPa with a ratio of the volume of hydrogen to volume of hydrocarbon feed within the range 100 to 600 liters per liter, and at an hourly space velocity (HSV), defined by the ratio of the volumetric flow rate of liquid hydrocarbon feed to the volume of catalyst fed into the reactor, within the range 1 to 10 $h^{-1}$.

* * * * *